US012774189B2

(12) United States Patent
Nagarajan et al.

(10) Patent No.: US 12,774,189 B2
(45) Date of Patent: Oct. 27, 2026

(54) SYSTEM AND METHOD FOR ADDRESSING ELEVATOR DRIVE FAULTS

(71) Applicant: Otis Elevator Company, Farmington, CT (US)

(72) Inventors: Prasanna Nagarajan, Farmington, CT (US); Shantanu Godbole, New Britain, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1613 days.

(21) Appl. No.: 17/133,897

(22) Filed: Dec. 24, 2020

(65) Prior Publication Data

US 2022/0204315 A1 Jun. 30, 2022

(51) Int. Cl.
*B66B 5/00* (2006.01)
*B66B 1/34* (2006.01)

(52) U.S. Cl.
CPC .......... *B66B 5/0025* (2013.01); *B66B 1/3453* (2013.01)

(58) Field of Classification Search
CPC ............ B66B 1/34–3423; B66B 1/3446–3461
See application file for complete search history.

(56) References Cited

U.S. PATENT DOCUMENTS 6,392,537 B1 * 5/2002 Tazumi ................. B66B 5/0006 49/31
2011/0178977 A1 * 7/2011 Drees ..................... G05B 15/02 706/52
2018/0186602 A1 7/2018 Herkel et al.
2018/0251337 A1 * 9/2018 Matsueda ............. B66B 1/3453
2019/0010018 A1 1/2019 Lovett
2019/0206155 A1 * 7/2019 Mustonen ............. B66B 5/0006
2019/0373530 A1 * 12/2019 Witczak ................ H04W 72/04
2019/0382237 A1 12/2019 Witczak et al.
2020/0002125 A1 1/2020 Liaskas et al.

FOREIGN PATENT DOCUMENTS

CN 111285205 A 6/2020
CN 111847164 A 10/2020
WO 2015198459 A1 12/2015
WO 2017187499 A1 11/2017

OTHER PUBLICATIONS

European Office Action issued in European Application No. 21212863.1 dated Feb. 19, 2024.
Chinese First Office Action issued in Chinese Application No. 202110953224.4 dated Oct. 31, 2023.

* cited by examiner

*Primary Examiner* — Christopher Uhlir
(74) *Attorney, Agent, or Firm* — CANTOR COLBURN LLP

(57) ABSTRACT

Disclosed is a monitoring system for a people mover system, having: a controller for controlling an electronic component of the people mover system, wherein the controller is configured to: determine a first operational status of the component, while the component is operating with first operational parameters; and transmit first controller data to a BOT service, directly or via a mobile device, wherein the first controller data is indicative of the first operational status.

16 Claims, 7 Drawing Sheets

SYSTEM AND METHOD FOR ADDRESSING ELEVATOR DRIVE FAULTS

BACKGROUND

The embodiments herein relate to an elevator system and more specifically to a system and method for addressing elevator drive faults.

Passenger conveyor systems such as elevator, escalator, and moving walkway systems are widely used all over the world. During installation, these systems may experience drive faults. In order to install these systems efficiently, downtime to resolve such faults should be minimized. Solutions to faults however may not be readily available.

BRIEF SUMMARY

Disclosed is a monitoring system for a people mover system, including: a controller for controlling an electronic component of the people mover system, wherein the controller is configured to: determine a first operational status of the component, while the component is operating with first operational parameters; and transmit first controller data to a BOT service, directly or via a mobile device, wherein the first controller data is indicative of the first operational status.

In addition to one or more of the above aspects or as an alternate, the controller is configured to: determine, from the first operational status, an occurrence of a fault condition; and transmit with the first controller data, to the BOT service, directly or via the mobile device, first fault data indicative of the fault condition.

In addition to one or more of the above aspects or as an alternate, the controller is configured to: determine the occurrence of the fault condition via a comparison of first operating conditions of the component with predetermined thresholds.

In addition to one or more of the above aspects or as an alternate, the controller is configured to: communicate with the mobile device via a first wireless protocol; and the mobile device is configured to communicate with the BOT service via a second wireless protocol that differs from the first wireless protocol, wherein the first wireless protocol is a personal area network protocol and the second wireless protocol is a cellular network protocol or TCP/IP protocol.

In addition to one or more of the above aspects or as an alternate, the BOT service is configured to: receive the first controller data from the controller, directly or via the mobile device, including the first operational parameters, the first operational status, and the first fault data; and one or more of; identify second operational parameters, that differs from the first operational parameters, from the first fault data and transmit the second operational parameters to the controller, directly or via the mobile device; and instruct the mobile device to display a message for a user to manually input or apply one or more of the second operational parameters or protocols via one or more of the mobile device and a user interface of the controller.

In addition to one or more of the above aspects or as an alternate, the BOT service is configured to: feed the first controller data to a predictive model generated from a collected dataset of operational parameters, operational status and fault data obtained from a distributed set of people mover systems; identify, from the predictive model, the second operational parameters to resolve the fault condition.

In addition to one or more of the above aspects or as an alternate, the controller is configured to: receive second operational parameters that differ from the first operational parameters, via: the BOT service, directly or via the mobile device; or the mobile device or a user interface on the controller from selective engagement with a user of the mobile device; and operate the component with the second operational parameters.

In addition to one or more of the above aspects or as an alternate, the controller is configured to: determine a second operational status of the component while the component is operating with the second operational parameters, via a comparison of second operating conditions of the component with the predetermined thresholds; and transmit second controller data to the BOT service, directly or via the mobile device, indicative of the second operational status of the component.

In addition to one or more of the above aspects or as an alternate, the controller is configured to: determine, from the second operational status, whether the fault condition is resolved or unresolved; and transmit with the second controller data, to the BOT service, directly or via the mobile device, second fault data indicative of the fault condition being resolved or unresolved.

In addition to one or more of the above aspects or as an alternate, the people mover is an elevator car.

Further disclosed is a method of operating a people mover system, the system including a controller for controlling an electronic component of the people mover system, wherein the method includes the controller: determining a first operational status of the component, while the component is operating with first operational parameters; and transmitting first controller data to a BOT service, directly or via a mobile device, wherein the first controller data is indicative of the first operational status.

In addition to one or more of the above aspects of the method, or as an alternate, the method includes the controller: determining, from the first operational status, an occurrence of a fault condition; and transmitting with the first controller data, to the BOT service, directly or via the mobile device, first fault data indicative of the fault condition.

In addition to one or more of the above aspects of the method, or as an alternate, the method includes the controller: determining the occurrence of the fault condition via a comparison of first operating conditions of the component with predetermined thresholds.

In addition to one or more of the above aspects of the method, or as an alternate, the method includes the controller communicating with the mobile device via a first wireless protocol; and the mobile device communicating with the BOT service via a second wireless protocol that differs from the first wireless protocol, wherein the first wireless protocol is a personal area network protocol and the second wireless protocol is a cellular network protocol or TCP/IP protocol.

In addition to one or more of the above aspects of the method, or as an alternate, the method includes the BOT service: receiving the first controller data from the controller, directly or via the mobile device, including the first operational parameters, the first operational status, and the first fault data; and one or more of: identifying second operational parameters, that differs from the first operational parameters, from the first fault data and transmitting the second operational parameters to the controller, directly or via the mobile device; and instructing the mobile device to display a message for a user to manually input or apply one or more of the second operational parameters or protocols via one or more of the mobile device and a user interface of the controller.

In addition to one or more of the above aspects of the method, or as an alternate, the method includes the BOT service: feeding the first controller data to a predictive model generated from a collected dataset of operational parameters, operational status and fault data obtained from a distributed set of people mover systems; identifying, from the predictive model, the second operational parameters to resolve the fault condition.

In addition to one or more of the above aspects of the method, or as an alternate, the method includes the controller: receiving second operational parameters, that differs from the first operational parameters, via: the BOT service, directly or via the mobile device; or the mobile device or a user interface on the controller from selective engagement with a user of the mobile device; and operating the component with the second operational parameters.

In addition to one or more of the above aspects of the method, or as an alternate, the method includes the controller: determining a second operational status of the component while operating the component operating with the second operational parameters, via a comparison of second operating conditions of the component with the predetermined thresholds; and transmitting second controller data to the BOT service, directly or via the mobile device, indicative of the second operational status.

In addition to one or more of the above aspects of the method, or as an alternate, the method includes the controller: determining, from the second operational status, whether the fault condition is resolved or unresolved; and transmitting with the second controller data, to the BOT service, directly or via the mobile device, second fault data indicative of the fault condition being resolved or unresolved.

In addition to one or more of the above aspects of the method, or as an alternate, wherein: the people mover is an elevator car.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
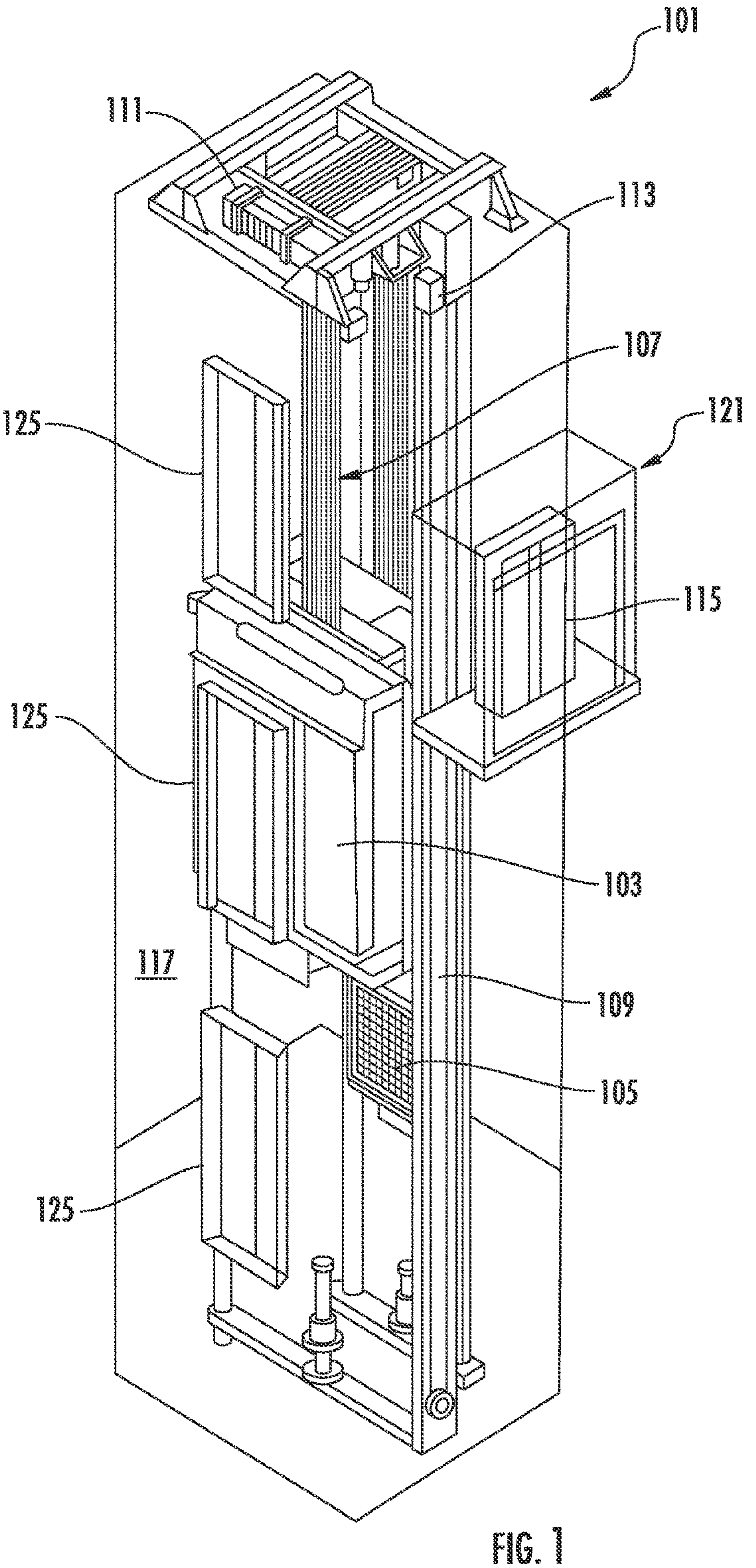
FIG. 1 is a schematic illustration of an elevator system that may employ various embodiments of the present disclosure.

FIG. 1 is a perspective view of an elevator system 101 (which may be generally considered a people mover system) including an elevator car 103 (which may be generally considered a people mover, which may include elevators, escalators, and moving walkways), a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 (alternatively referred to as a sensor) may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include sensing of any of vibration, acceleration, velocity, absolute position, pitch, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. Embodiments may also be employed in ropeless elevator systems using self-propelled elevator cars (e.g., elevator cars equipped with friction wheels, pinch wheels or traction wheels). FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Failure of the machine 111 (alternatively referred to as a drive unit) during installation (and routing or ad-hoc maintenance) requires drives to be returned to factory for further analysis. While some engineers have access to a personal computer (PC) tool at the jobsite that could extract information for further analysis, there may be no connectivity tool available during the installation phase to collect key data in order to troubleshoot the drive unit 111 and controller 115 otherwise at a jobsite.

Figure 2:
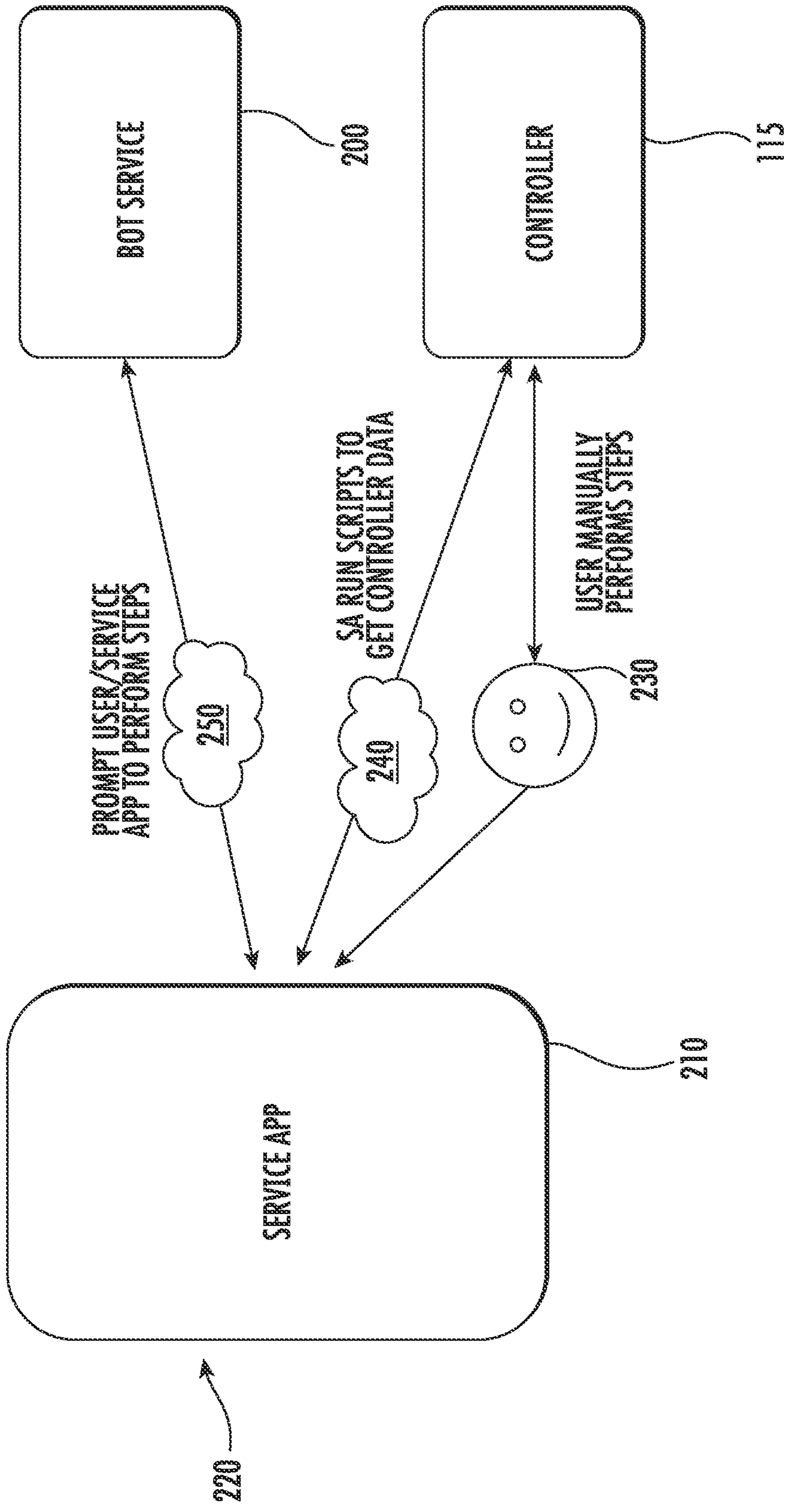
FIG. 2 is a process map of the elevator controller communicating bi-directionally with a BOT service via a mobile device, e.g., of a mechanic.

Turning to FIG. 2, in an exemplary embedment, a maintenance system and process is disclosed for detecting and curing errors with the drive unit 111 (FIG. 1) at an installation site. It is to be appreciated that this process also may be applied to detecting and curing errors with all electronic components of an elevator, escalator and/or moving walkway system, including all drive systems, door operational systems, load weighting systems, all electronic controllers, etc.

The controller 115 may communicate with a BOT service 200 via a service software application (app) 210 executed on a mobile device 220 (e.g., a smartphone, tablet, laptop, or other type of mobile device) of a user 230, which may be an on-site mechanic. The controller 115 may communicate with the mobile device 220 via a first wireless network 240 and the mobile device may communicate with the BOT service 200 via a second wireless network 250 that differs from the first wireless network 240. Though in one embodiment the first and second networks 240, 250 are the same type of network, and in one embodiment the controller 115, mobile device 220 and BOT service 200 are on the same network, e.g., on the same local area network. For example, the first wireless network 240 may be a personal area network (such as Bluetooth, WiFi, Zigbee, Z-wave, NFC, or other protocol discussed below) and the second wireless network 250 may be TCP/IP network such as the internet, or may be a cellular network. These example networks are not intended on limiting the scope of the disclosure.

Figure 3:
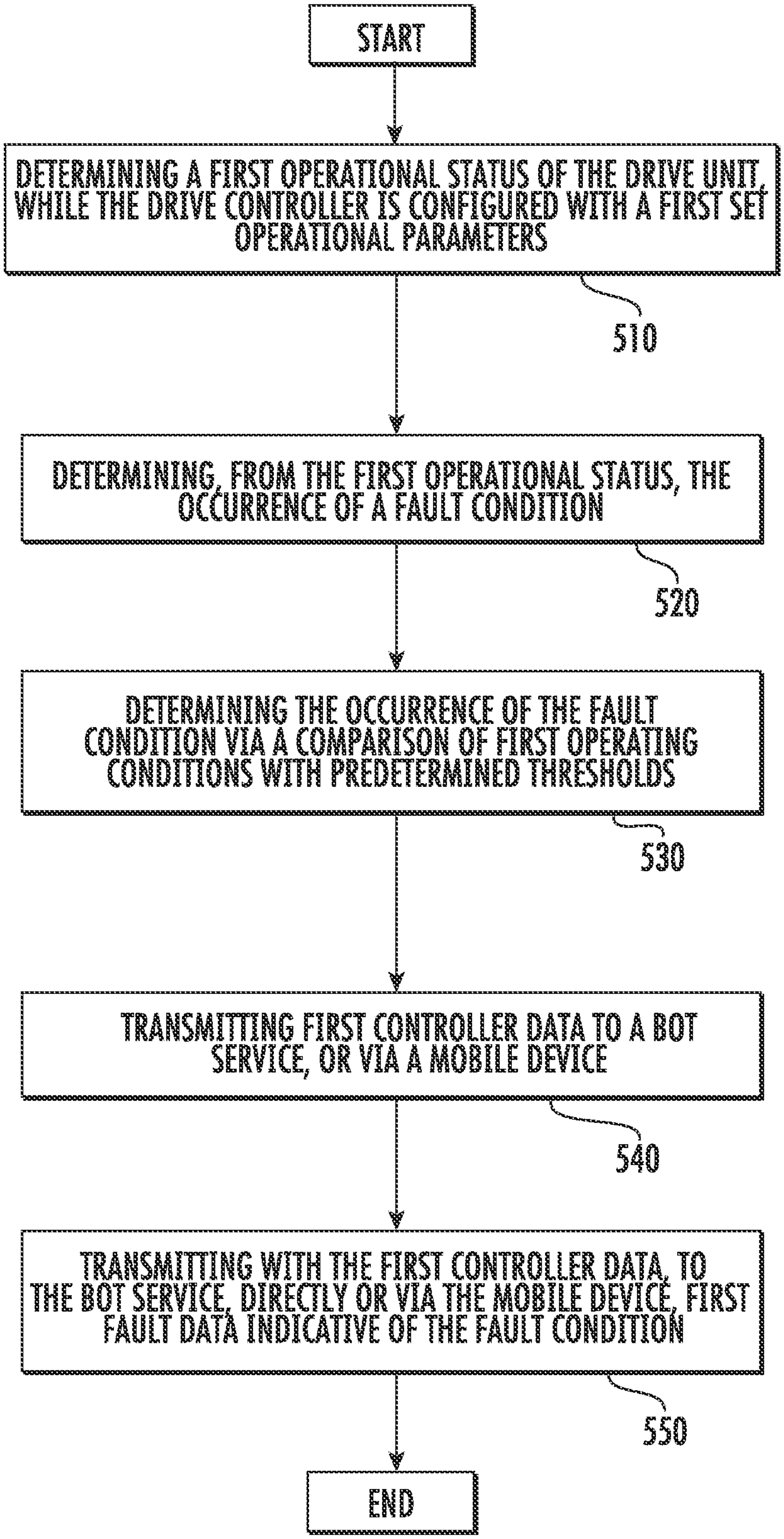
FIG. 3 is a flowchart showing a method of identifying a fault by the controller and thereafter communicating an alert from the controller to the BOT service.

More specifically, as shown in FIG. 3, a flowchart shows the method of identifying a fault by the controller 115 and thereafter communicating an alert from the controller 115 to the BOT service 200. As shown in block 510, the method includes the controller 115 determining a first operational status of the drive unit 111, while the drive unit 111 is operating with first operational parameters. As shown in block 520 the method includes the controller 115 determining, from the first operational status, the occurrence of a fault condition. For example, as shown in bock 530 the method includes the controller 115 determining the occurrence of the fault condition via a comparison of first operating conditions of the drive unit 111 with predetermined thresholds, which may be stored on the controller 115 in the form of look-up tables. The conditions may be detected using the sensors 113 (FIG. 1) that are operationally connected to the controller 115.

As shown in block 540, the method includes the controller 115 transmitting first controller data to the BOT service 200, directly or via the mobile device 220. As indicated, the controller 115 is configured to communicate with the mobile device 220 via the first wireless network 240 executing a first wireless protocol. The mobile device 220 may be configured to communicate with the BOT service 200 via the second wireless network 250 executing a second wireless protocol that differs from the first wireless protocol. That is, the first wireless protocol may be a personal area network protocol such as Bluetooth and the second wireless protocol may be is a cellular network protocol or TCP/IP protocol. As shown in block 550, the method includes the controller 115 transmitting with the first controller data, to the BOT service, directly or via the mobile device 220, first fault data indicative of the fault condition.

Figure 4:
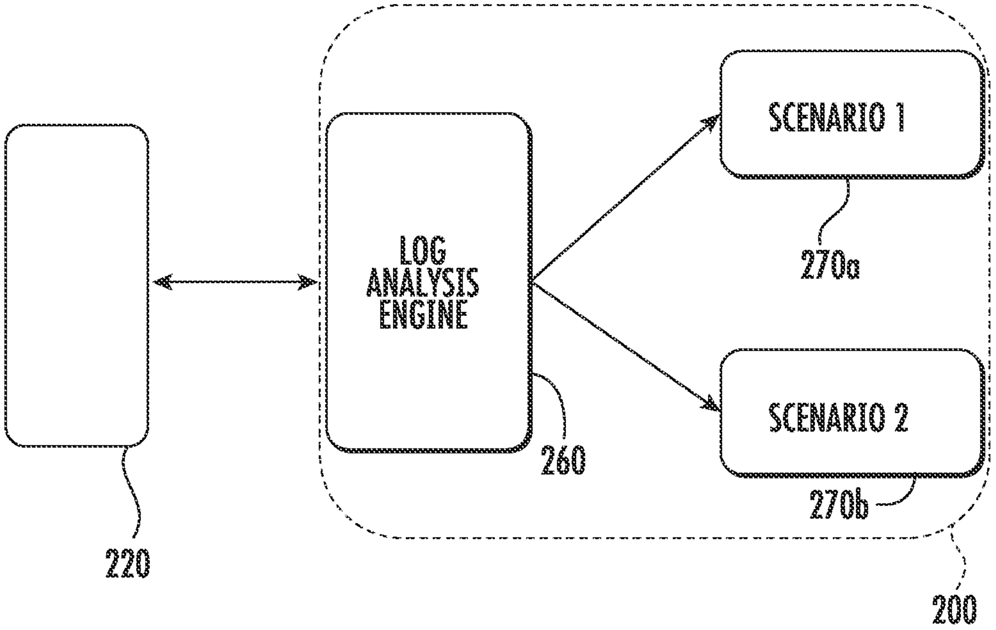
FIG. 4 is a process map showing aspects of the process occurring by the BOT service once it has received the transmission from the mobile device.

Turning to FIG. 4, a process map shows additional aspects of the process occurring by the BOT service 200 once it has received the transmission from the mobile device 220. In this instance, the BOT service 200 is configured to communicate with the controller 115 as well as the user 230 via the service app 210 on the mobile device 220 in an effort to resolve the fault. The BOT service 200 may lookup a solution based on the identified fault (e.g. via an automated fault tree process) and send data to the controller 115 for the controller to execute. From this, the controller 115 would update the configuration parameters of the drive unit 111. Alternatively, the BOT service 200 may determine that it does not have an identified solution and may instruct the user (mechanic) 230 to update the configuration of the drive unit 111 manually. For example, the BOT service 200 may utilize the service app 210 on the mobile device 220 to display instructions on a display of the mobile device 220 indicating the user (mechanic) 230 should use their own experience in an effort to resolve the fault. The user (mechanic) 230 may provide for adjusting manual input or providing feedback of observable information to calibrate or confirm update implementation, or to obtain feedback from the user (mechanic) 230 on situations where the BOT service 200 does not have a solution, e.g., which may be unique to an installation location.

In identifying the solution, the BOT service 200 may use a machine learning process, and for example, a decision tree learning process in a logic analysis engine 260 (e.g., a predictive model) in an effort to resolve the fault. That is, the BOT service 200 may communicate with a global or regional distributed network of elevator systems, e.g., which may be cloud based systems. From these communications, the BOT service 200 may collect configuration data, fault data, and fault resolution data. This may enable the BOT service 200 to identify a short list of potentially similar scenarios 270*a*, 270*b*, e.g., that are similar enough to the scenario of the drive unit 111, to justify selecting, e.g., fault resolution data to resolve the present fault. The fault resolution data may be in the form of an updated configuration for the controller 115 to enter for the drive unit 111, bypassing the user (mechanic) 230 during this process.

Figure 5:
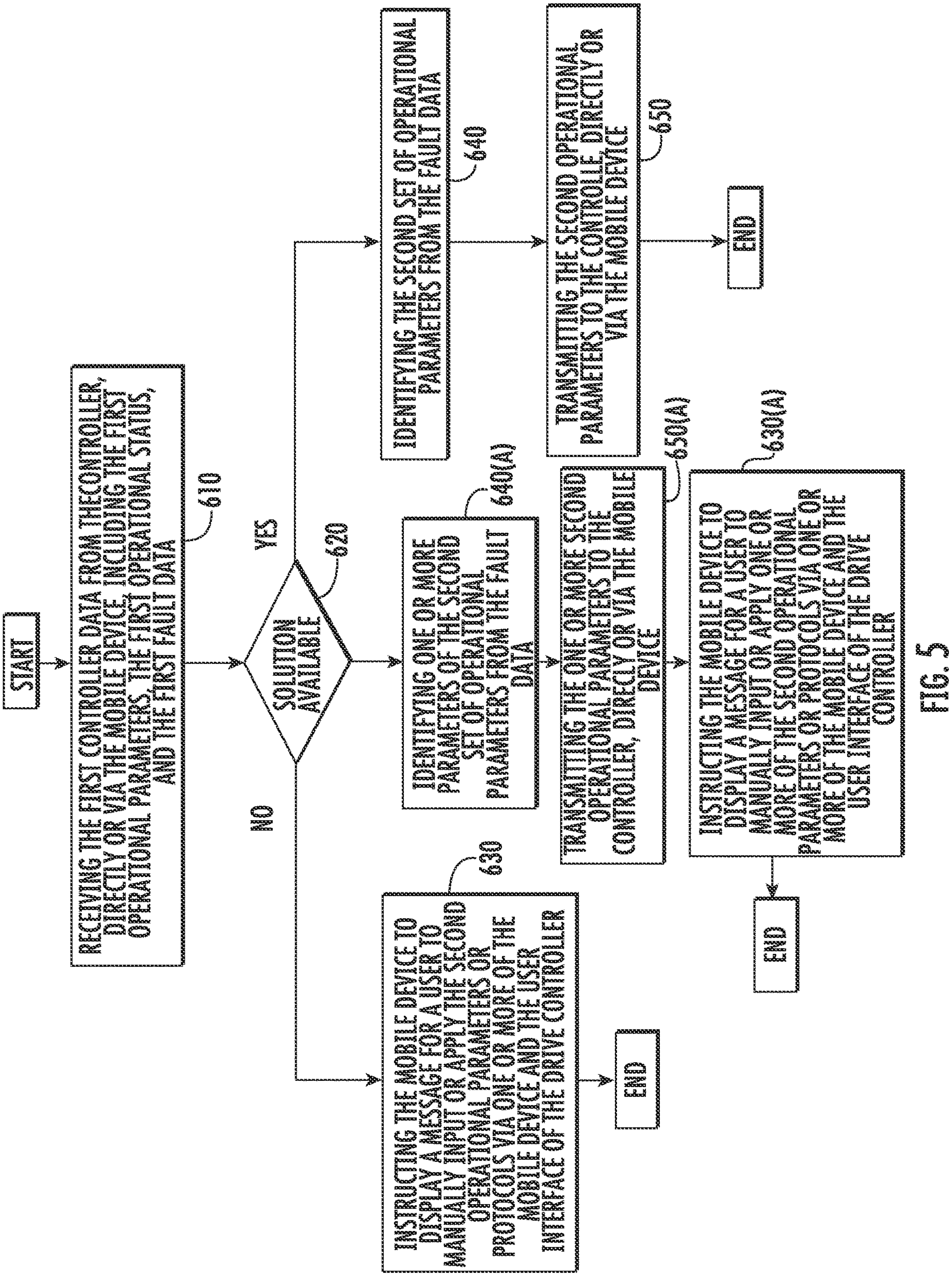
FIGS. 5-6 are flowcharts showing a method executed by the BOT service for addressing an identified fault.
Figure 6:
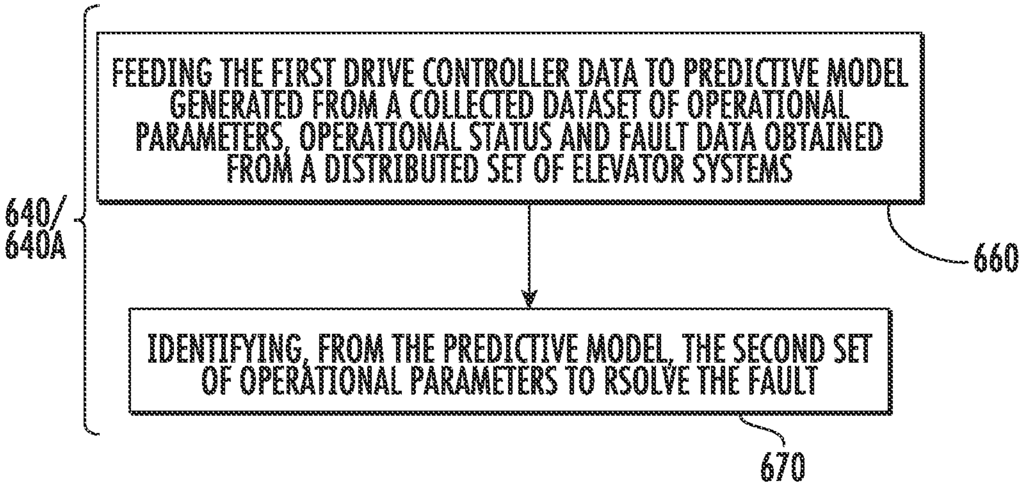

For example, turning to FIGS. 5-6, flowcharts show a method executed by the BOT service 200 for addressing the fault. Turning to FIG. 5, as shown in block 610 the method includes the BOT service 200 receiving the first drive unit data from the drive unit, directly or via the mobile device, including the first operational parameters, the first operational status, and the first fault data. As shown in block 620 the method includes the BOT service 200 determining whether a solution exists for the identified fault. If not (No at 620) then as indicated in block 630, the method includes the BOT service 200 instructing the mobile device 220 to display a message for the user 230 to manually input or apply one or more of the second operational parameters or protocols via one or more of the mobile device 220 and a user interface of the controller 115. As indicated, the user (mechanic) 230, with their experience, would trouble shoot a solution by inputting or applying second operational parameters or protocols. Such protocols may include a visually check of wiring, sensor input, relay function etc. For instance, sometimes, mechanics may wire incorrectly, and a controller reports a fault. The BOT service (based on past learnings) may instruct the mechanic to check wiring and run a diagnostic.

If the BOT service 200 has a solution (YES at 620) then as indicated in block 640 the method includes the BOT service 200 identifying the second operational parameters from the fault data. As shown in block 650 the method includes the BOT service 500 transmitting the second operational parameters to the controller 115, directly or via the mobile device 220.

A third option is a hybrid between the two identified options. For example, the BOT service 200 may identify certain parameters of the second parameters that can be transmitted to the controller 115, directly or via the mobile device 220 (e.g. as shown in block 640A), which are transmitted to the controller 114 (block 650A). Other parameters or protocols may require manual input or application and/or feedback by the user (mechanic) 230 (as shown in block 630A).

FIG. 6 expands on blocks 640/640A to include particular aspects of the machine learning features of the disclosed embodiments, identified above. As shown in block 660 the method may include feeding the first controller data to a predictive model generated from a collected dataset of operational parameters, operational status and fault data obtained from a distributed set of elevator systems. As shown in block 670 the method may include the BOT service 200 identifying, from the predictive model, the second operational parameters to resolve the fault.

Figure 7:
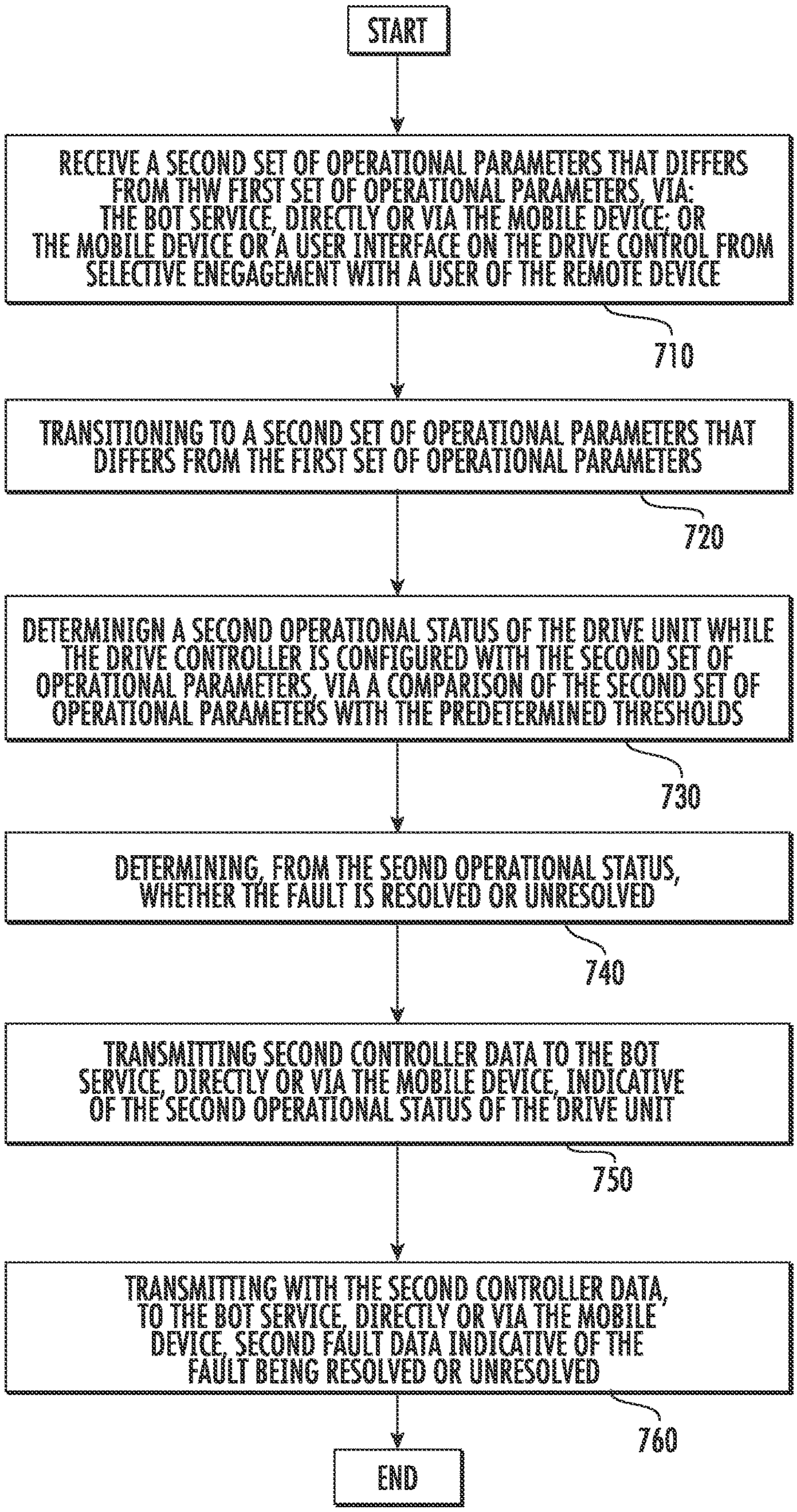
FIG. 7 a block diagram shows further processing by the controller upon receiving the updated operational parameters.

Turning to FIG. 7 a block diagram shows further processing by the controller 115 upon receiving the updated operational parameters. As shown in block 710 the method includes the controller 115 receiving the second operational parameters, that differs from the first operational parameters, via: the BOT service 200, directly or via the mobile device 220; or the mobile device 220 or a user interface on the controller 115 from selective engagement with a user (mechanic) 230. As shown in block 720, the method includes the controller 115 operating the drive unit 111 (which includes instructing the drive unit 111 to operate) with the second operational parameters. As shown in block 730, the method includes the controller 115 determining a second operational status of the drive unit 111 while the drive unit 111 is operating with the second operational parameters, via a comparison of second operating conditions of the drive unit 111 with the predetermined thresholds. As shown in block 740 the method includes the controller 115 determining, from the second operational status, whether the fault is resolved or unresolved. As shown in block 750 the method includes the controller 115 transmitting second controller data to the BOT service 200, directly or via the mobile device 220, indicative of the second operational status of the drive unit 111. As shown in block 760, the method includes the controller 115 transmitting with the second controller data, to the BOT service 200, directly or via the mobile device 220, second fault data indicative of the fault being resolved or unresolved. This portion of the process is similar to FIG. 3. Thus, if the fault is not resolved, or if another fault exists, the process identified via FIGS. 4-6 would occur until all faults are resolved.

The above disclosed embodiments focus on leveraging digital platforms including a smart phone app to collect elevator key information and communicate to remote experts (e.g., BOTs, as well as active responders) to facilitate real time troubleshooting. The identified process includes collecting key elevator data with a single button click through smart phone app and sending it to an expert (or BOT); providing automated troubleshooting steps through the interactive BOT sessions; providing a fault tree-based analysis with an ability to directly communicate with elevators via elevator controllers; and utilizing machine learning via a database that captures drive and controller issues from jobsite along with their resolution steps. With machine learning over time and gathering data from distributed systems, the BOT service may compare a current set of conditions with similar configurations, accounting for atmospheric, geographic, utilization patterns and conditions including loading and types of loading (people, cargo, etc.)

With the above disclosed embodiments, reference to machine learning (ML) is the study of computer algorithms that improve automatically through experience. It is seen as a subset of artificial intelligence. Machine learning algorithms build a model based on sample data, known as “training data”, in order to make predictions or decisions without being explicitly programmed to do so. Machine learning algorithms are used in a wide variety of applications, such as email filtering and computer vision, where it is difficult or unfeasible to develop conventional algorithms to perform the needed tasks. Decision tree learning uses a decision tree as a predictive model to go from observations about an item (represented in the branches) to conclusions about the item’s target value (represented in the leaves). It is one of the predictive modeling approaches used in statistics, data mining, and machine learning. Tree models where the target variable can take a discrete set of values are called classification trees; in these tree structures, leaves represent class labels and branches represent conjunctions of features that lead to those class labels. Decision trees where the target variable can take continuous values (typically real numbers) are called regression trees. In decision analysis, a decision tree can be used to visually and explicitly represent decisions and decision making. In data mining, a decision tree describes data, but the resulting classification tree can be an input for decision making.

The BOT service, identified above, otherwise known as a robot or bot, is a software application that runs automated tasks (scripts) via a service provider, which may be a remote server available via the web, and may be a cloud service. Typically, bots perform tasks that are relatively simple and repetitive, much faster than a person could. Bots may utilize automated scripts to fetch, analyze and file information from servers. A bot is an app that users interact with in a conversational way, using text, graphics (such as cards or images), or speech. One type of BOT service is an Azure Bot Service is a cloud platform. It hosts bots and makes them available to channels. The Bot Framework Service, which may be a component of the Azure Bot Service, sends information between the user’s bot-connected app (which is another name for the channel) and the bot. Each channel may include additional information in the activities they send.

Sensor data identified herein may be obtained and processed separately, or simultaneously and stitched together, or a combination thereof, and may be processed in a raw or complied form. The sensor data may be processed on the sensor (e.g. via edge computing), by controllers identified or implicated herein, on a cloud service, or by a combination of one or more of these computing systems. The senor may communicate the data via wired or wireless transmission lines, applying one or more protocols as indicated below.

Wireless connections may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. Other LPWAN-IOT technologies include narrowband internet of things (NB-IOT) and Category M1 internet of things (Cat M1-IOT). Wireless communications for the disclosed systems may include cellular, e.g. 2G/3G/4G (etc.). Other wireless platforms based on RFID technologies include Near-Field-Communication (NFC), which is a set of communication protocols for low-speed communications, e.g., to exchange date between electronic devices over a short distance. NFC standards are defined by the ISO/IEC (defined below), the NFC Forum and the GSMA (Global System for Mobile Communications) group. The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or complied, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium. Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A monitoring system for a people mover system, comprising:

a BOT service; and a controller for controlling an electronic component of the people mover system, wherein the component operates per settings of operational parameters;

wherein the controller is configured to:

determine a first operational status of the component, while the component is operating with first operational parameters, and determine, from the first operational status, an occurrence of a fault condition; and transmit first fault data indicative of the fault condition with first controller data indicative of the first operational status to the BOT service, directly or via a mobile device, wherein the BOT service is configured to:

(i) receive the first controller data from the controller, directly or via the mobile device, including the first operational parameters, the first operational status, and the first fault data;

(ii) identify second operational parameters, that differs from the first operational parameters, from the first fault data;

(iii) determine that ones of the second operational parameters are configured for being adjusted automatically and others of the second operational parameters are configured for being adjusted manually;

(iv) transmit the ones of the second operational parameters to the controller, directly or via the mobile device, to automatically update respective ones of the operational parameters;

(v) instruct the mobile device to display a message for a user to manually input or apply the others of the second operational parameters via one or more of the mobile device and a user interface of the controller, to thereby manually update respective others of the operational parameters;

(vi) upon failing to resolve the fault via (i) to (v): (a) instruct the mobile device to display a further message for the user to manually update the operational parameters; and (b) receive feedback from the user via the mobile device, to determine whether the fault is resolved; and (vii) repeat (i) and (vi) until the fault condition is resolved.

2. The system of claim 1, wherein:

the controller is configured to:

determine the occurrence of the fault condition via a comparison of first operating conditions of the component with predetermined thresholds.

3. The system of claim 2, wherein:

the controller is configured to communicate with the mobile device via a first wireless protocol; and the mobile device is configured to communicate with the BOT service via a second wireless protocol that differs from the first wireless protocol, wherein the first wireless protocol is a personal area network protocol and the second wireless protocol is a cellular network protocol or TCP/IP protocol.

4. The system of claim 3, wherein:

the BOT service is configured to:

feed the first controller data to a predictive model generated from a collected dataset of operational parameters, operational status and fault data obtained from a distributed set of people mover systems;

identify, from the predictive model, the second operational parameters to resolve the fault condition.

5. The system of claim 3, wherein:

the controller is configured to:

receive second operational parameters that differ from the first operational parameters, via:

the BOT service, directly or via the mobile device; or the mobile device or a user interface on the controller from selective engagement with a user of the mobile device; and operate the component with the second operational parameters.

6. The system of claim 5, wherein:

the controller is configured to:

determine a second operational status of the component while the component is operating with the second operational parameters, via a comparison of second operating conditions of the component with the predetermined thresholds; and transmit second controller data to the BOT service, directly or via the mobile device, indicative of the second operational status of the component.

7. The system of claim 6, wherein:

the controller is configured to:

determine, from the second operational status, whether the fault condition is resolved or unresolved; and transmit with the second controller data, to the BOT service, directly or via the mobile device, second fault data indicative of the fault condition being resolved or unresolved.

8. The system of claim 1, wherein:

the people mover system comprises an elevator car.

9. A method of operating a people mover system, the system including a controller for controlling an electronic component of the people mover system, wherein the component operates per settings of operational parameters;

wherein the method includes the controller:

determining a first operational status of the component, while the component is operating with first operational parameters, and determining, from the first operational status, an occurrence of a fault condition; and transmitting first fault data indicative of the fault condition with first controller data indicative of the first operational status to a BOT service, directly or via a mobile device, wherein the method includes the BOT service:

(i) receiving the first controller data from the controller, directly or via the mobile device, including the first operational parameters, the first operational status, and the first fault data;

(ii) identifying second operational parameters, that differs from the first operational parameters, from the first fault data;

(iii) determining that ones of the second operational parameters are configured for being adjusted automatically and others of the second operational parameters are configured for being adjusted manually;

(iv) transmitting the ones of the second operational parameters to the controller, directly or via the mobile device, to automatically update respective ones of the operational parameters;

(v) instructing the mobile device to display a message for a user to manually input or apply the others of the second operational parameters or protocols via one or more of the mobile device and a user interface of the controller, to thereby manually update respective others of the operational parameters;

(vi) upon failing to resolve the fault via (i) to (v): (a) instruct the mobile device to display a further message for the user to manually update the operational parameters; and (b) receive feedback from the user via the mobile device, to determine whether the fault is resolved; and (vii) repeating (i) and (vi) until the fault condition is resolved.

10. The method of claim 9, comprising the controller:

determining the occurrence of the fault condition via a comparison of first operating conditions of the component with predetermined thresholds.

11. The method of claim 10, comprising:

the controller communicating with the mobile device via a first wireless protocol; and the mobile device communicating with the BOT service via a second wireless protocol that differs from the first wireless protocol, wherein the first wireless protocol is a personal area network protocol and the second wireless protocol is a cellular network protocol or TCP/IP protocol.

12. The method of claim 11, comprising:

the BOT service:

feeding the first controller data to a predictive model generated from a collected dataset of operational parameters, operational status and fault data obtained from a distributed set of people mover systems;

identifying, from the predictive model, the second operational parameters to resolve the fault condition.

13. The method of claim 11, comprising the controller:

receiving second operational parameters, that differs from the first operational parameters, via:

the BOT service, directly or via the mobile device; or the mobile device or a user interface on the controller from selective engagement with a user of the mobile device; and operating the component with the second operational parameters.

14. The method of claim 13, comprising the controller:

determining a second operational status of the component while operating the component operating with the second operational parameters, via a comparison of second operating conditions of the component with the predetermined thresholds; and transmitting second controller data to the BOT service, directly or via the mobile device, indicative of the second operational status.

15. The method of claim 14, comprising the controller:

determining, from the second operational status, whether the fault condition is resolved or unresolved; and transmitting with the second controller data, to the BOT service, directly or via the mobile device, second fault data indicative of the fault condition being resolved or unresolved.

16. The method of claim 9, wherein:

the people mover system comprises an elevator car.

* * * * *